Jan. 9, 1951     O. J. POUPITCH     2,537,786
FASTENING DEVICE
Filed June 11, 1945
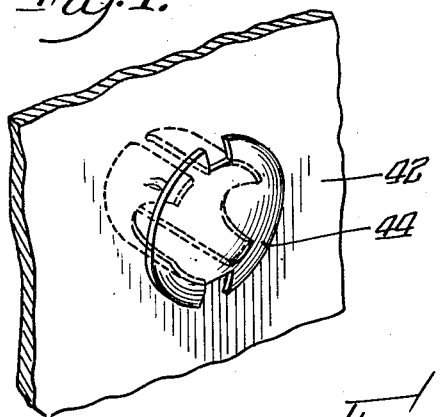
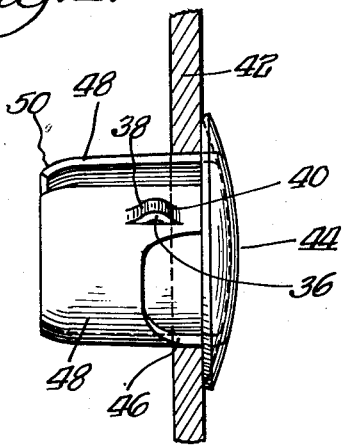
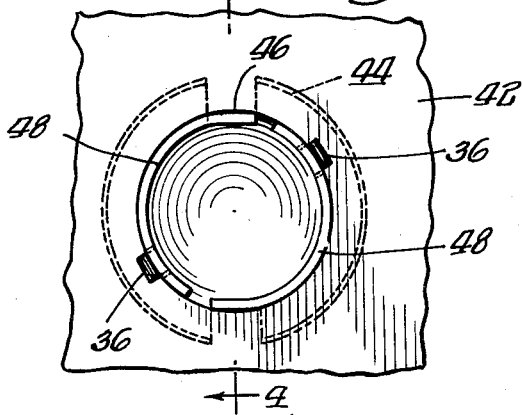
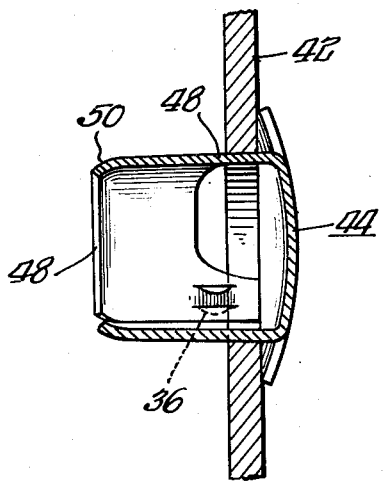
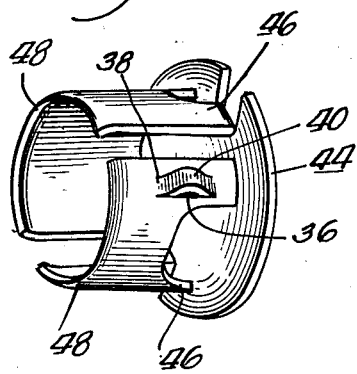
INVENTOR.
Ougljesa Jules Poupitch
BY
Moore, Olson & Trexler
Attys Patented Jan. 9, 1951

2,537,786

UNITED STATES PATENT OFFICE 2,537,786

FASTENING DEVICE

Ougljesa Jules Poupitch, Chicago, Ill., assignor to Illinois Tool Works, Chicago, Ill., a corporation of Illinois Application June 11, 1945, Serial No. 598,820

6 Claims. (Cl. 85—5)

This invention relates to fastening devices, and more particularly to fastening devices made of sheet metal or the like, for use with apertures formed in sheet metal bodies or strips or the like.

The invention contemplates a fastener having very effective holding power, and capable of being applied and removed at will, without injury to the aperture or the fastener, with facility, ease, and dispatch, without the use of any special tools. The invention also provides a fastener of light weight and ease of manufacture and of great adaptability for many different applications of work.

In the fasteners of the character described in the prior art for use in connection with an aperture formed in a sheet metal surface, difficulty has been experienced in having the gripping elements conform to the configuration of the aperture. The resilient arms which exert the gripping action through their inherent resiliency, extend in the direction of the axis of the aperture, with the result that their length is such that there is usually a loss of the necessary stiffness required for holding power unless a heavier gauge metal is employed.

One object of my invention is to provide a fastening device which may be positioned in an aperture formed in an article and when positioned by insertion through the aperture will be automatically locked against inadvertent displacement axially of the aperture.

Another object of my invention is to provide a fastening device having resilient portions which exercise the locking action extending in a direction transverse to the axis of the aperture.

Another object of my invention is to provide a fastening device for use in connection with openings, of such construction that the resilient portions thereof will closely conform to the configuration of the aperture.

A further object of my invention is to provide a fastening device for use with apertures formed in sheet metal surfaces designed to be stamped from a piece of sheet metal and so shaped as to provide maximum strength and effective holding power.

Yet another object of my invention is to provide a sheet metal fastening device for use in apertures of such form and construction that it may be easily and expeditiously inserted into the aperture without the use of tools.

Other and further objects of my invention will appear from the following description.

Referring now to the drawings which form part of the instant specification, and which are to be read in conjunction therewith and in which like reference numerals are used to indicate like parts of the various views, Fig. 1 is a perspective view of a fastener of my invention showing a different embodiment thereof.

Fig. 2 is a horizontal central sectional view of the structure shown in Fig. 1 with the apertured work piece or plate shown in section and the fastener per se shown in elevation.

Fig. 3 is a plan view of the fastener shown in Fig. 1.

Fig. 4 is a sectional view taken on the line 4—4 of Fig. 3.

Fig. 5 is a perspective view of the fastener shown in Figs. 1 to 4 inclusive.

The fastener in Figures 1 to 5, inclusive, is adapted to be used with a circular aperture and for purposes of convenience the fastener is shown as carrying a cover plate, though it is to be understood that any suitable instrumentality may be carried by the fastener. Referring now to Fig. 1, an aperture is formed in a plate 42, which may be a panel or part of any suitable structure or surface. From a body portion 44 I provide upwardly extending neck portions 46 in the case shown in the figures, two in number. It will be understood of course that any desired number of neck portions and associated tongues may be formed, depending on the size of the aperture, to be used in conjunction with my fastener. Three or four make an excellent structure for a comparatively large size aperture. From each of the neck portions 46 I provide tongue portions 48, each of which is provided with a boss 36 formed with inclined surfaces 38 and 40. The lead-in inclination of each boss 36 is at a lesser angle than the retaining inclined surface 40. The tongues 48 are formed in accordance with the contour of the aperture with which the fastener is to be used, in this case along the periphery of a circle. The base member or head 44 is shown as a button-like, dished structure so that the fastener may be used as an aperture plug in the event nothing is desired to be supported from the aperture. The surface of the button or head 44 may be finished in conformity with the surface 42.

If it be desired to secure something to the surface 42, the plug fastener may be removed and a similar fastener carrying a suitable holding means may be then reinserted. The upper portions of the tongues 48 are formed with a filet 50 so that the leading edge of the fastener lies along a circle of smaller diameter than the diameter of the aperture for ease in insertion.

It will be observed that I have accomplished the objects of my invention. I have provided a fastener which may be stamped out of sheet metal or thin cold rolled metal and formed to shape the fastener, and which is light in weight and has high holding power. At the same time it is easy to insert and to remove without the use of special tools and may be inserted and removed frequently at will without injury to the fastener or the aperture wall in connection with which the fastener is used. The spring tongues which exert the holding force and exercise the locking action through the bosses extend transversely of the aperture. The short spring section makes for stiffness and the construction is such that the spring tongues may be readily formed to fit the contour of the aperture. My construction enables me to achieve a surprisingly high degree of holding power for a given gauge of sheet metal. This results in high efficiency and light weight.

It will be apparent to those skilled in the art that various changes may be made in details without departing from the spirit of my invention. This is contemplated by the accompanying claims. It is therefore to be understood that I am not to be limited to the specific details shown and described. Having thus described my invention, what I claim is:

1. A one-piece sheet metal fastener adapted to be inserted longitudinally into an aperture in a work piece, comprising a shank and a head having portions extending radially beyond the periphery of said shank, said shank including a plurality of stem portion extending from laterally spaced marginal portions of said head in a direction substantially parallel to the longitudinal axis of insertion and away from the underside of said head, a circumferentially extending tongue formed on the end of said stem portions disposed away from said head, the free end of said tongue extending back towards the head, and retaining means formed on the free end of said tongue, said retaining means normally extending beyond the periphery defined by the distance between said stem portions at the point of attachment to said head whereby to grip work pieces between said head and said retaining means.

2. A one-piece sheet metal fastener in accordance with claim 1, wherein the head is dished, with the rim thereof extending toward the entering end of the shank.

3. A one-piece sheet metal fastener in accordance with claim 1, wherein the entering end of the shank converges toward the shank axis to facilitate initial insertion within a complementary work aperture.

4. A one-piece sheet metal fastener in accordance with claim 1, wherein the advancing side of the retaining means in the free end of the tongue presents a surface having a lead-in inclination to facilitate entrance of said retaining means within a complementary work aperture.

5. A one-piece sheet metal fastener in accordance with claim 1, wherein the retaining means on the free end of the tongue comprise sections extruded outwardly from the shank stock.

6. A one-piece sheet metal fastener in accordance with claim 1, wherein the head is imperforate to provide a seal for a complementary work aperture.

OUGLJESA JULES POUPITCH.

REFERENCES CITED

The following references are of record in the file of this patent:

UNITED STATES PATENTS

| Number | Name | Date |
|---|---|---|
| 316,624 | Howard | Apr. 28, 1885 |
| 1,772,255 | Kondolf | Aug. 5, 1930 |
| 2,006,747 | Ritz | July 2, 1935 |
| 2,077,604 | Wiley | Apr. 20, 1937 |
| 2,086,288 | Van Uum | July 6, 1937 |
| 2,105,706 | Stamy | Jan. 18, 1938 |
| 2,110,959 | Lombard | Mar. 15, 1938 |
| 2,139,329 | Fessler | Dec. 6, 1938 |
| 2,139,567 | Van Uum | Dec. 6, 1938 |
| 2,178,719 | Cotter | Nov. 7, 1939 |
| 2,188,026 | Wiley | Jan. 23, 1940 |
| 2,198,186 | Tinnerman | Apr. 23, 1940 |
| 2,214,150 | Van Uum | Sept. 10, 1940 |
| 2,336,153 | Ryder | Dec. 7, 1943 |
| 2,430,809 | Flora et al. | Nov. 11, 1947 |
| 2,438,499 | Hartman | Mar. 30, 1948 |

FOREIGN PATENTS

| Number | Country | Date |
|---|---|---|
| 509,391 | Great Britain | July 14, 1939 |